United States Patent [19]

Bloom

[11] 4,141,627
[45] Feb. 27, 1979

[54] ELECTRO-OPTIC DEVICE

[75] Inventor: Allen Bloom, East Windsor, N.J.

[73] Assignee: RCA Corporation, New York, N.Y.

[21] Appl. No.: 757,374

[22] Filed: Jan. 6, 1977

[51] Int. Cl.$^2$ ............................ C09K 3/34; C02F 1/13
[52] U.S. Cl. ..................................... 350/349; 252/299;
252/408; 260/152; 260/154; 260/156; 260/157;
260/158; 260/177; 260/185; 260/196
[58] Field of Search ................. 252/299; 350/160 LC,
350/154; 260/185, 196, 158, 152, 197, 156, 154,
157

[56] References Cited

U.S. PATENT DOCUMENTS

| | | | |
|---|---|---|---|
| 2,400,877 | 5/1946 | Dreyer | 252/299 |
| 2,544,659 | 3/1951 | Dreyer | 252/299 |
| 3,597,044 | 8/1971 | Castellano | 350/160 LC |
| 3,703,329 | 11/1972 | Castellano | 350/160 LC |
| 3,833,287 | 9/1974 | Taylor et al. | 350/160 LC |
| 3,864,022 | 2/1975 | Moriyama et al. | 252/299 |
| 3,957,348 | 5/1976 | Saeva | 350/154 |
| 3,960,750 | 6/1976 | Moriyama et al. | 252/299 |
| 3,960,751 | 6/1976 | Moriyama et al. | 252/299 |
| 4,025,164 | 5/1977 | Doriguzzi et al. | 350/154 |
| 4,032,219 | 6/1977 | Constant et al. | 350/160 LC |

FOREIGN PATENT DOCUMENTS 2627215  1/1977  Fed. Rep. of Germany ........... 252/299

OTHER PUBLICATIONS

White, D. L., et al., J. Appl. Phys., vol. 45, No. 11, pp. 4718-4723 (Nov. 1974).
Blinov, L. M., et al., J. Phys. (Paris), vol. 36, Cl, No. 3, pp. 69-76 (1975).
Constant, J., et al., "Pleochroic Dyes with High Order Parameters," Presented at 6th Int. Liq. Cryst. Conf., Kent, Ohio (Aug. 1976).
Bloom, A., et al., Abstracts of the 6th Int. Liq. Cryst. Conf., Kent State Univ., Kent, Ohio, K-12 (Aug. 1976).

Primary Examiner—Benjamin R. Padgett
Assistant Examiner—T. S. Gron
Attorney, Agent, or Firm—H. Christoffersen; Birgit E. Morris

[57] ABSTRACT

Novel dyes of the formula

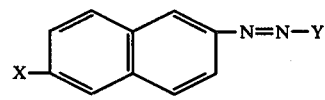

wherein X can be hydrogen, alkyl, alkoxy, cyano, nitro, dialkylamino, halogen or —N=N—Y and Y can be phenyl, phenyl substituted in the para position with an alkyl, alkoxy, cyano, nitro, dialkylamino or halogen group, or a heterocyclic ring, can be added to known liquid crystal compositions to impart color to the mixtures and improved contrast to a liquid crystal electro-optic device containing such mixtures.

5 Claims, 1 Drawing Figure

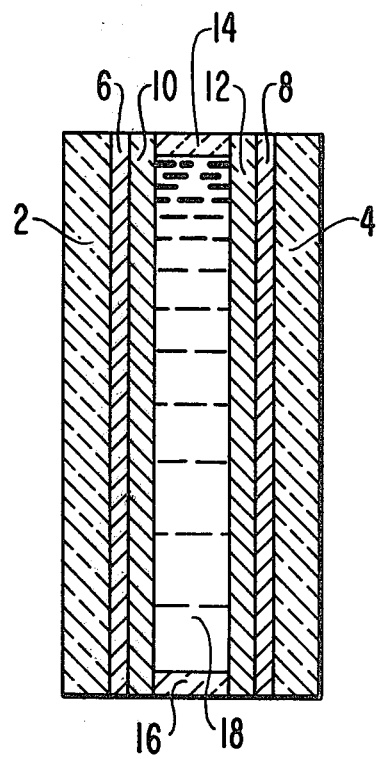

ELECTRO-OPTIC DEVICE

This invention relates to novel liquid crystal devices. More particularly, this invention relates to liquid crystal mixtures and devices containing novel dyes.

BACKGROUND OF THE INVENTION

Electro-optic devices containing liquid crystal materials have become commercially important in recent years because of their low power requirements and good contrast, particularly for applications such as watch faces, calculator, gas pump and instrument displays and the like. Although liquid crystal compounds have been known for many years, the discovery of nematic liquid crystals that have a transition temperature range that spans room temperature sparked a renewed interest in these materials and greatly expanded their marketability. Research is continuing to discover new room temperature liquid crystal materials and mixtures and for liquid crystal materials having improved contrast in electro-optic devices.

SUMMARY OF THE INVENTION

We have discovered novel dye compounds, 2,6-substituted azonaphthalenes. These dyes, when admixed in small amounts with low melting liquid crystal materials, impart strong colors to the mixtures but without materially affecting the transition temperature range of the liquid crystal composition to which they are added. The present dyes thus improve the color contrast of electro-optic devices employing these liquid crystal materials, and impart decorative colors over a wide range of hues, without adversely affecting other properties of the liquid crystals.

BRIEF DESCRIPTION OF THE DRAWING

The FIGURE is a cross-sectional view of an electro-optic device embodying the invention.

DETAILED DESCRIPTION OF THE INVENTION

The novel dyes of the present invention have the formula

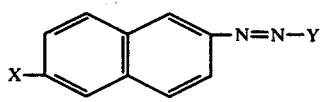

wherein X can be hydrogen, alkyl, alkoxy, cyano, nitro, dialkylamino, halogen or —N=N—Y, and Y can be phenyl, phenyl substituted in the para position with an alkyl, alkoxy, cyano, nitro, dialkylamino or halogen group, or a heterocyclic ring. Suitable heterocyclic rings have the formulas

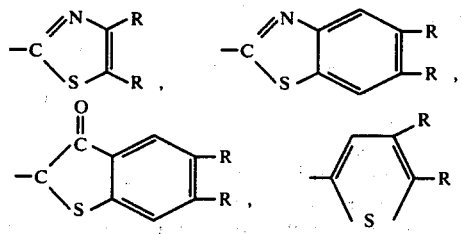

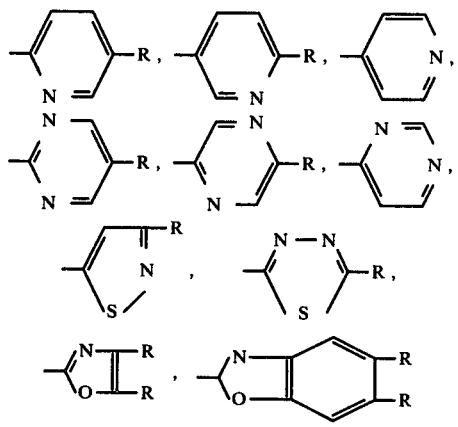

and the like wherein R can be hydrogen, alkyl, alkoxy, cyano, nitro, dialkylamino or halogen.

These dyes have comparatively high melting temperatures, are deeply colored materials and as such are of little interest alone in liquid crystal cells. However, these dye compounds can be admixed with low melting temperature liquid crystal compounds in small amounts to impart strong colors to the mixtures but without materially changing their useful temperature range.

The above-described dyes can be prepared by diazotizing a 6-substituted-2-naphthylamine and reacting with an appropriate aromatic or heterocyclic compound. The product is isolated and purified in known manner, as by column chromatography and recrystallization from a suitable solvent.

The dyes can be admixed with nematic liquid crystal compositions to impart a color characteristic of each dye. Low melting temperature nematic liquid crystal compositions, particularly p-alkoxybenzylidene-p'-alkylanilines and their mixtures with other liquid crystals, and mixtures of p-alkoxy- or -acyloxybenzylidene-p'-cyanoanilines, have a transition temperature range that includes room temperature and are particularly suitable. The exact amount of dye to be added depends on the solubility of the dye in the liquid crystal composition and also on the color desired. In general, from about 0.05% up to about 2% by weight of the liquid crystal mixture of the dyestuff will be employed.

P-alkoxybenzylidene-p'-butylanilines are known liquid crystal compounds and are described for example in U.S. Pat. No. 3,829,491 which issued Aug. 13, 1974 to Strebel. Mixtures of p-methoxybenzylidene-p'-n-butylaniline (hereinafter referred to as MBBA) and p-ethoxybenzylidene-p'-n-butylaniline (hereinafter referred to as EBBA) have particularly broad and low useful temperature ranges that encompass room temperature. Mixtures containing about 35 to about 70% by weight of MBBA are preferred.

P-alkoxybenzylidene-p'cyanoanilines are also known and are described in U.S. Pat. No. 3,499,702, issued Mar. 10, 1970, to Goldmacher et al. A mixture comprising about 85 weight percent of a 70:30 mixture of MBBA and EBBA and about 15% by weight of p-ethoxybenzylidene-p'-cyanoaniline has been described by Tarry, Services Electronic Research Laboratory Technical Journal, Vol. 23, No. 1, 1973. This mixture is particularly appropriate for field effect liquid crystal devices. P-acyloxybenzylidene-p'-cyanoanilines have been disclosed by Castellano in U.S. Pat. No. 3,597,044.

In preparing an electro-optic device, liquid crystal compounds should be rigorously purified to remove ionic and nonionic impurities which may react to degrade the liquid crystal compounds either by decomposition, transubstitution reactions and the like. For commercially acceptable cells, the liquid crystal compounds should be purified so that their resistivity is about $1 \times 10^{11}$ ohm-cm or higher.

In addition to the liquid crystal and dye, other additives such as homeotropic or chiral aligning agents and ionic organic compounds can also be added to the liquid crystal mixture, as is known.

Referring to the Figure, a liquid crystal cell is constructed from two glass plates 2 and 4 having conductive indium-doped tin oxide coatings 6 and 8, respectively, on facing surfaces thereof. Thin silicon oxide layers 10 and 12 are evaporated onto the conductive layers 6 and 8, respectively, at an angle of 30°. One-half mil (25.4 microns) thick glass frit spacers 14 and 16 maintain the coated glass plates 2 and 4 apart to complete the cell components. The cell is baked at 525° C. to melt the glass frit and seal the cell except for a fill port. The cell is filled with the desired liquid crystal composition 18 in the isotropic state and hermetically sealed with solder.

The invention will be further illustrated by the following Examples but it is to be understood that the invention is not meant to be limited to the details disclosed therein. In the Examples, parts and percentages are by weight unless otherwise noted.

The extinction coefficient is defined as the optical density divided by concentration divided by the path length of light and is a measure of how strongly a particular dyestuff absorbs.

The order parameter is a measure of how well the particular dyestuff aligns in a liquid crystal host. The higher the order parameter, the greater the contrast between the on and off states in the liquid crystal cell.

EXAMPLE 1

A solution of 1.1 grams of 6-methoxy-2-naphthylamine hydrochloride in 100 ml. of 5 N hydrochloric acid was cooled to about 0° C. when 0.42 gram of sodium nitrite was added to form a yellowish-green solution. A solution of 0.809 gram of thioindoxyl ($C_8H_6OS$) in 100 ml. of ethanol was also prepared and 50 ml. of 10 N sodium hydroxide and 10 grams of sodium carbonate was stirred in. The resultant solution was cooled to about 0° C. A stream of nitrogen was bubbled through this solution and the first yellowish-green solution added to it slowly. The reaction mixture turned a deep red color. Anhydrous sodium acetate was added until a pH of 5 was obtained. After stirring for about 20 minutes, the solution was poured into ice water, stirred for 30 minutes longer and filtered.

The precipitate was dissolved in hot benzene and eluted through a silica gel bed with benzene. The first band was collected and recrystallized from benzene/hexane.

The product having the formula

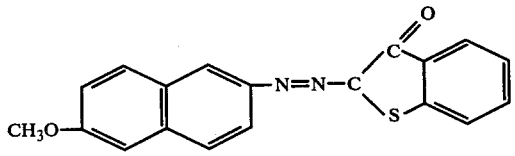

had a melting point of 230° C.

EXAMPLE 2

A solution of 1.1 grams of 6-methoxy-2-naphthylamine in 70 ml. of boiling 5 N hydrochloric acid was precipitated and cooled to about 0° C. after which 0.42 gram of sodium nitrite was added. A second solution was prepared of 9 grams of N,N-diethylamine and 25 grams of sodium acetate in 100 ml. of ice water and the two solutions were combined. The mixture was stirred for 2 hours and the precipitate filtered off and dried.

The orange product was isolated by repeated silica gel column chromatography using chloroform and benzene as the eluents and purified by recrystallization twice from benzene/hexane.

The product having the formula

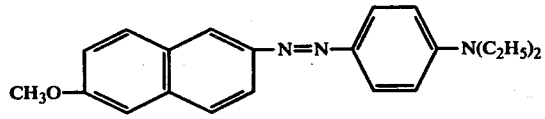

had a melting point of 165°–165.5° C.

EXAMPLE 3

A mixture of 0.24% of the dyestuff of Example 1 and a nematic liquid crystal mixture containing 85% of 70:30 molar proportion of MBBA and EBBA and 15% of p-ethoxybenzylidene-p'-aminobenzonitrile was charged to a liquid crystal cell as in the Figure. The liquid crystal mixture was aligned parallel to the face of the cell.

The optical density, as seen through plane polarized light parallel to the liquid crystal orientation, was measured at the visible absorption maximum (525 nm) at 0.431. When a voltage of 10 volts was applied to the cell, the optical density was 0.075.

The extinction coefficient ($M^{-1} cm^{-1}$) was measured at 36,900 (DMF). The order parameter (S) was 0.63.

A comparision of color and alignment properties was made with a cell as above except that the liquid crystal dyestuff had the formula

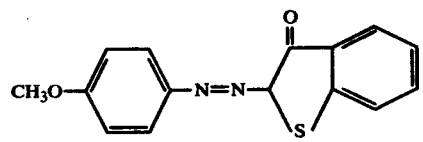

This liquid crystal-dye mixture had a less intense color (extinction coefficient was 31,000) and was not aligned as well, its order parameter measured at 0.56.

EXAMPLE 4

A mixture of 0.228% of the dyestuff of Example 2 and the liquid crystal mixture of Example 3 was charged to a liquid crystal cell as in the Figure.

The optical density, measured at 470 nm, was 0.618 in the off state. When a voltage of 10 volts was applied to the cell, the optical density was 0.094.

The extinction coefficient was 34,600 and the order parameter was 0.64.

What is claimed is:

1. In an electro-optic device comprising a nematic liquid crystal composition having a positive dielectric anisotropy between two electrodes, the improvement wherein said nematic liquid crystal composition contains a dye of the formula

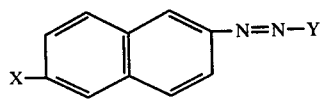

wherein X can be hydrogen, alkyl, alkoxy, cyano, nitro, dialkylamino, halogen or —N=N—Y and Y can be phenyl, phenyl substituted in the para position with an alkyl, alkoxy, cyano, nitro, dialkylamino or halogen group, or a heterocyclic ring.

2. A device according to claim 1 wherein X is methoxy and Y is

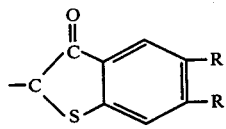

wherein R can be hydrogen, alkyl, alkoxy, cyano, nitro, dialkylamino or halogen.

3. A device according to claim 1 wherein X is methoxy and Y is p-diethylaminophenyl.

4. A nematic liquid crystal composition comprising a nematic liquid crystal having a positive dielectric anisotropy and a compound of the formula

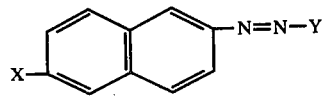

wherein X can be hydrogen, alkyl, alkoxy, cyano, nitro, dialkylamino, halogen or —N=N—Y and Y can be phenyl, phenyl substituted in the para position with an alkyl, alkoxy, cyano, nitro, dialkylamino or halogen group, or a heterocyclic ring.

5. A composition according to claim 4 wherein the nematic liquid crystal is a mixture of p-methoxybenzylidene-p'-n-butylaniline, p-ethoxybenzylidene-p'-n-butylaniline and one or more compounds having the formula

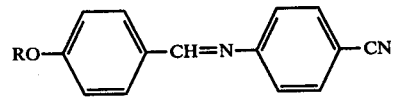

wherein R is an alkyl group.

* * * * *